United States Patent
Kogan et al.

(10) Patent No.: US 12,157,519 B2
(45) Date of Patent: Dec. 3, 2024

(54) RECIRCULATING-BALL STEERING SYSTEM

(71) Applicant: Knorr-Bremse Systeme Für Nutzfahrzeuge GmbH, Munich (DE)

(72) Inventors: Alexander Kogan, Cologne (DE); Jens-Hauke Mueller, Velbert-Neviges (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 840 days.

(21) Appl. No.: 17/289,032

(22) PCT Filed: Oct. 29, 2019

(86) PCT No.: PCT/EP2019/079490
§ 371 (c)(1),
(2) Date: Apr. 27, 2021

(87) PCT Pub. No.: WO2020/089208
PCT Pub. Date: May 7, 2020

(65) Prior Publication Data
US 2021/0403077 A1 Dec. 30, 2021

(30) Foreign Application Priority Data
Oct. 31, 2018 (DE) ............... 10 2018 127 204.9

(51) Int. Cl.
*B62D 3/10* (2006.01)
*B62D 5/04* (2006.01)

(52) U.S. Cl.
CPC .......... *B62D 3/10* (2013.01); *B62D 5/0421* (2013.01); *B62D 5/046* (2013.01)

(58) Field of Classification Search
CPC .......... B62D 3/10; B62D 5/0421; B62D 5/046
See application file for complete search history.

(56) References Cited

U.S. PATENT DOCUMENTS 4,625,625 A * 12/1986 Reynolds ............. B60T 13/163
  91/450
5,327,986 A *  7/1994 Saita ................... B62D 5/0463
  74/661

(Continued)

FOREIGN PATENT DOCUMENTS

CN  1492975 A   4/2004
CN  1688472 A  10/2005
(Continued)

OTHER PUBLICATIONS

International Search Reported dated Feb. 12, 2020 for PCT/EP2019/079490.

(Continued)

*Primary Examiner* — Tony H Winner
(74) *Attorney, Agent, or Firm* — NORTON ROSE FULBRIGHT US LLP; Gerard A. Messina

(57) ABSTRACT

A recirculating-ball steering system for transmitting a steering movement to a steering arm, includes: a housing having a steering piston arranged inside the housing, wherein the steering piston includes a ball screw drive and is displaceable along its longitudinal axis, and an electrical actuator for assisting the movement of the steering piston. Also described is a vehicle having the recirculating-ball steering system.

16 Claims, 14 Drawing Sheets

(56) References Cited

U.S. PATENT DOCUMENTS

| | | | |
|---|---|---|---|
| 6,945,350 B2* | 9/2005 | Szabela | B62D 5/092 |
| | | | 180/413 |
| 8,360,197 B2* | 1/2013 | Escobedo | B62D 5/0454 |
| | | | 180/407 |
| 10,814,904 B2* | 10/2020 | Washnock | B62D 7/18 |
| 2012/0241243 A1 | 9/2012 | Zaloga et al. | |
| 2012/0241244 A1 | 9/2012 | Escobedo et al. | |
| 2013/0213727 A1 | 8/2013 | Bieber et al. | |
| 2018/0244305 A1* | 8/2018 | Cai | B62D 5/001 |

FOREIGN PATENT DOCUMENTS

| | | |
|---|---|---|
| CN | 101277044 A | 10/2008 |
| CN | 103124666 A | 5/2013 |
| CN | 103851148 A | 6/2014 |
| CN | 105564498 A | 5/2016 |
| CN | 207200476 U | 4/2018 |
| CN | 108367771 A | 8/2018 |
| CN | 108602525 A | 9/2018 |
| DE | 102012204376 A1 | 9/2012 |
| DE | 102014106488 A1 | 11/2015 |
| DE | 102014106493 A1 | 11/2015 |
| DE | 102015118292 A1 | 4/2017 |
| JP | H05153757 A | 6/1993 |
| JP | 2010253992 A | 11/2010 |
| JP | 2016150645 A | 8/2016 |

OTHER PUBLICATIONS

"Configuration and Maintenance of Vehicle Chassis," Du Ruifeng, et al., Higher Education Press, published Jun. 30, 2007, pp. 239-240.

* cited by examiner

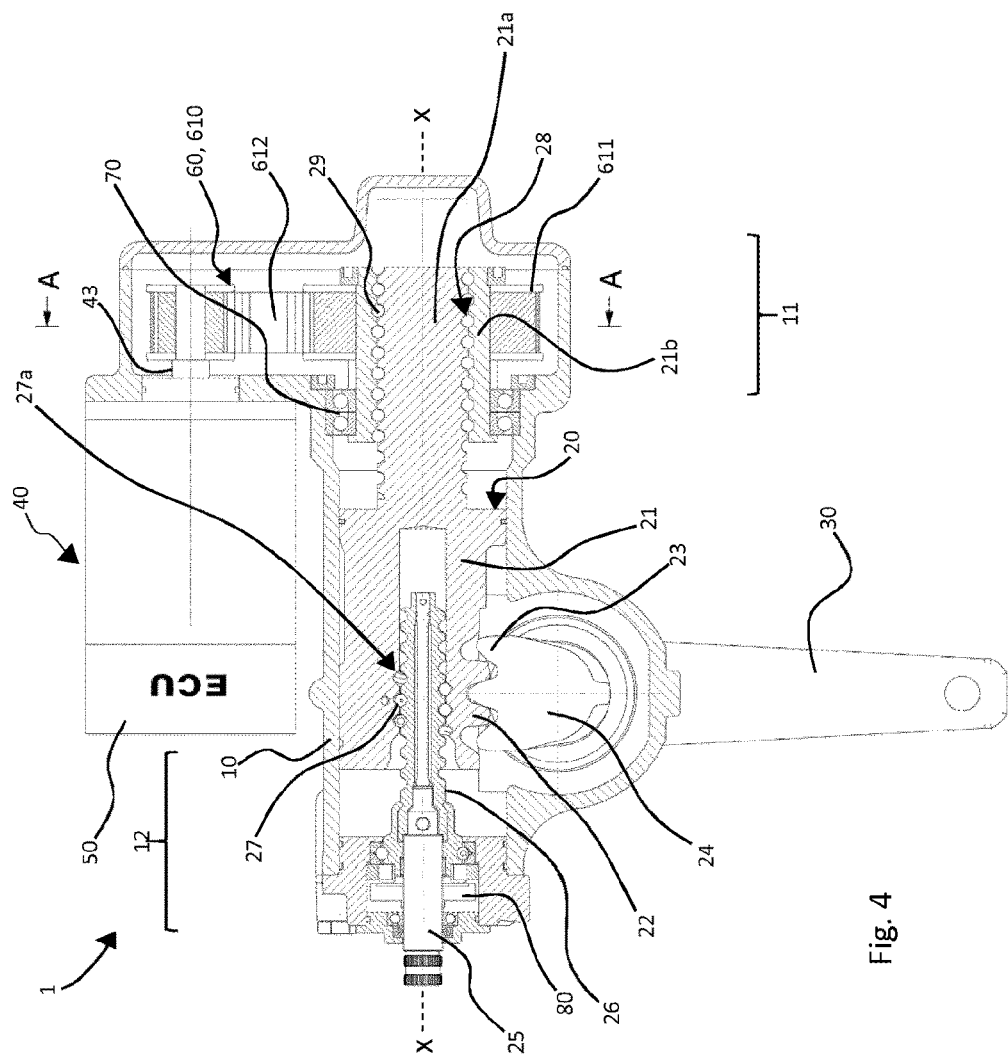
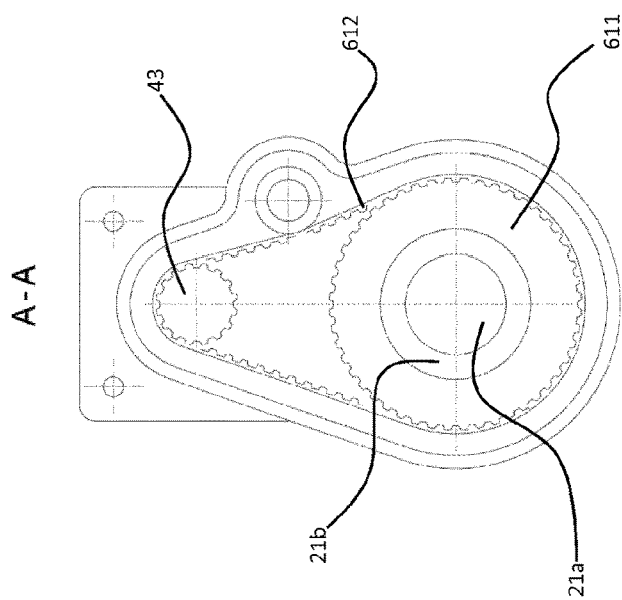
Fig. 4
Fig. 4a

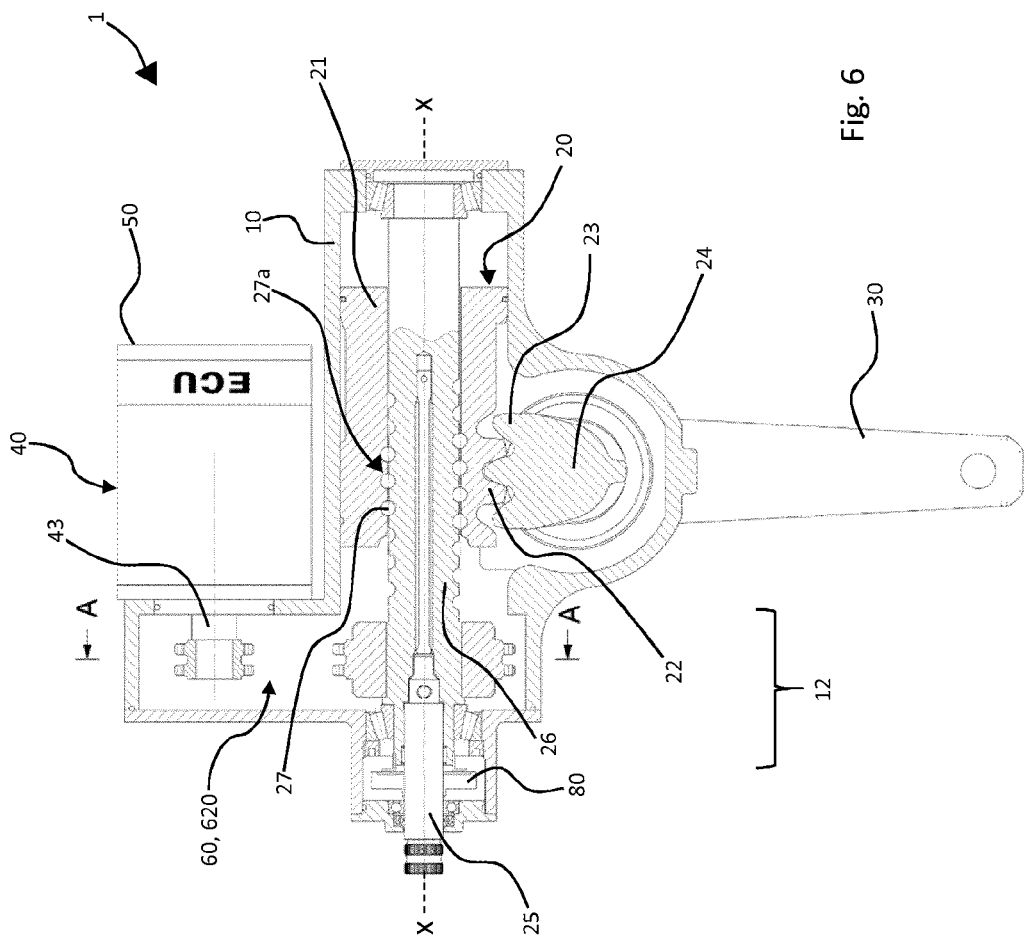
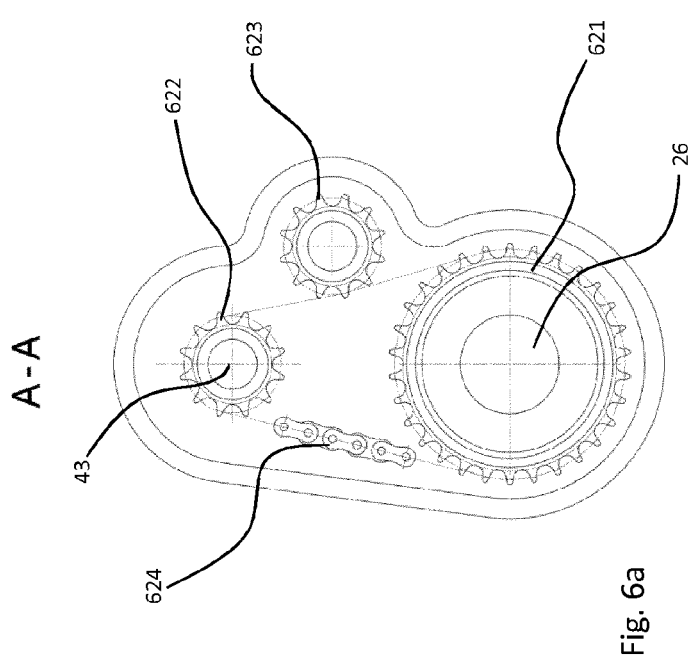

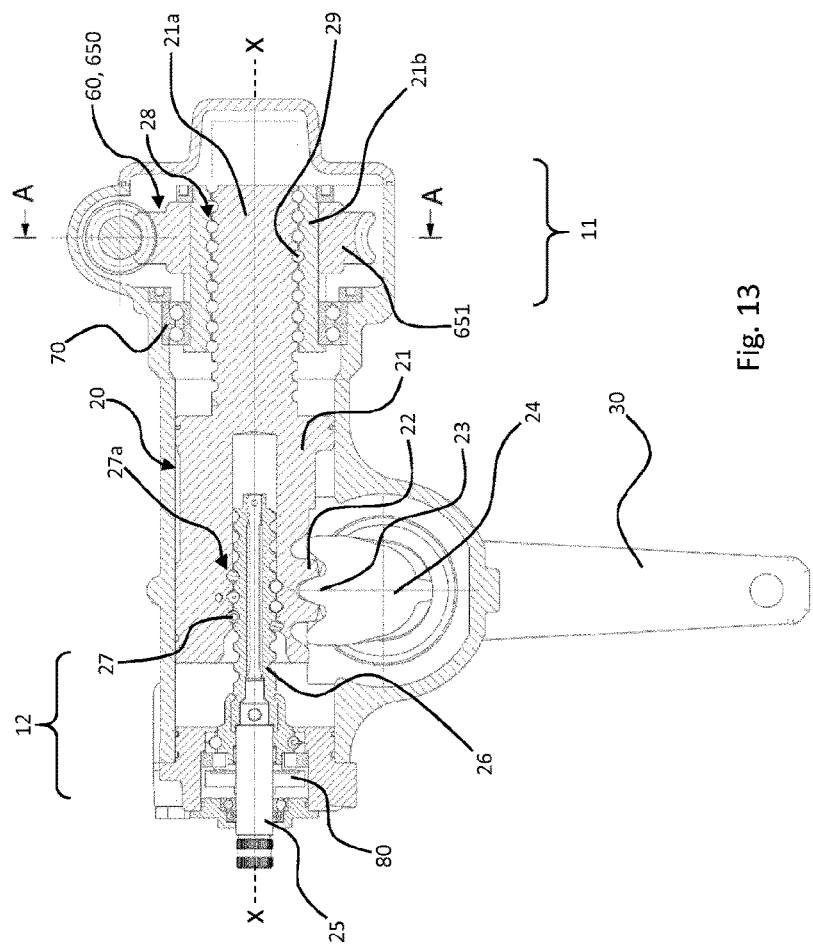
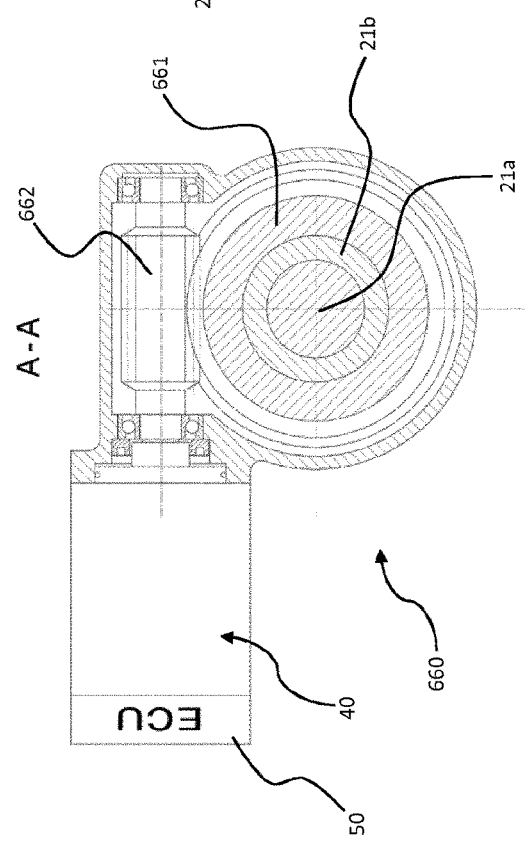
Fig. 13
Fig. 13a

RECIRCULATING-BALL STEERING SYSTEM

FIELD OF THE INVENTION

The present invention concerns a recirculating-ball steering system for a vehicle, in particular a truck, for transmitting a steering movement to a steering arm. The present invention furthermore concerns a vehicle, in particular a truck, comprising the recirculating-ball steering system according to the invention.

BACKGROUND INFORMATION

Recirculating-ball steering systems are used amongst others in light and heavy trucks, and form part of the steering gear which transmits the rotational movement of the steering wheel to track rods, either directly or indirectly via linkagesm depending on design. A recirculating-ball steering system is a type of spindle steering gear in which the force between the spindle nut is transmitted by balls which circulate in screw threads.

Such steering gear types are believed to have been understood and are available in various versions. Thus for example documents DE 10 2014 106 488 A1 and DE 10 2014 106 493 A1 discuss recirculating-ball steering systems in which the steering assistance is obtained by the use of hydraulics.

Hydraulic systems however have a complicated infrastructure. As well as the complex hydraulic piping, further components such as pumps, hoses or seals are required.

SUMMARY OF THE INVENTION

It is therefore an object of the present invention to provide a recirculating-ball steering system which is improved in comparison with the prior art, in particular a recirculating-ball steering system which has a significantly simplified infrastructure.

According to the invention, this object is achieved by a recirculating-ball steering system with the features as described herein. Advantageous further embodiments are indicated in the respective further descriptions of further embodiments.

The recirculating-ball steering system according to the invention comprises a housing with a steering piston arranged inside the housing, wherein the steering piston comprises a ball screw drive and is displaceable along its longitudinal axis. The recirculating-ball steering system according to the invention furthermore comprises an electrical actuator for assisting the movement of the steering piston.

The inventors have found that the combination of the at least one ball screw drive and the electrical actuator allows the creation of a recirculating-ball steering system without hydraulic components. The additional force assistance necessary for the steering movement is provided purely electrically.

Since a complex hydraulic system may thus be omitted, and a simple connector is sufficient to supply the electrical actuator with electrical power, installation of the recirculating-ball steering system by the customer is considerably simplified.

It has furthermore been found that particularly compact recirculating-ball steering systems can be produced with such an arrangement.

In a design variant, the steering piston comprises a second ball screw drive which is coupled to the electrical actuator, in particular in which a threaded nut of the ball screw drive is combined with a rotor of the electrical actuator. Since a ball screw drive has a very high efficiency, the combination of the threaded nut with the rotor allows the use of a lower-powered electrical actuator, which particularly advantageously influences the size of the recirculating-ball steering system.

In another design variant, the electrical actuator is connected to the steering piston via a force transmission means. The force transmission means allows a physical separation between the electrical actuator and the steering piston, so that the recirculating-ball steering system can be specifically adapted to customer requirements with respect to spatial geometry.

In a further design variant, the steering piston comprises a second ball screw drive which is coupled to the electrical actuator via a force transmission means.

The force transmission means may be selected from the group comprising a toothed belt gear, a chain gear, a cog gear, a bevel gear, a hypoid gear, a contrate gear or a worm gear.

In a particular design variant, the recirculating-ball steering system contains no hydraulic unit, and the movement of the steering piston is assisted purely electrically.

According to a further aspect, the present invention concerns a vehicle, in particular a truck, comprising the recirculating-ball steering system according to the invention.

Further advantages and features of the device according to the invention arise from the further descriptions herein which refer to advantageous embodiments of the present invention and as such should not be interpreted restrictively. The invention also comprises combinations of the features of different embodiments, where technically possible, even if the further embodiments do not refer to one another or if they belong to different claim categories. This also applies to the individual features of the exemplary embodiments discussed below, insofar as the person skilled in the art finds that these do not necessarily belong together.

The exemplary embodiments described below are intended to explain the invention in more detail for the person skilled in the art. The exemplary embodiments are explained with reference to the appended drawings.

BRIEF DESCRIPTION OF THE DRAWINGS

FIG. 4 shows a fourth design variant of a recirculating-ball steering system according to the invention in cross-section.

FIG. 4a shows an illustration of the embodiment variant from FIG. 4 along section line A-A.

FIG. 6 shows a sixth design variant of a recirculating-ball steering system according to the invention in cross-section.

FIG. 6a shows an illustration of the embodiment variant from FIG. 6 along section line A-A.

FIG. 13 shows a thirteenth design variant of a recirculating-ball steering system according to the invention in cross-section.

FIG. 13a shows an illustration of the embodiment variant from FIG. 13 along section line A-A.

DETAILED DESCRIPTION

Figure 1:
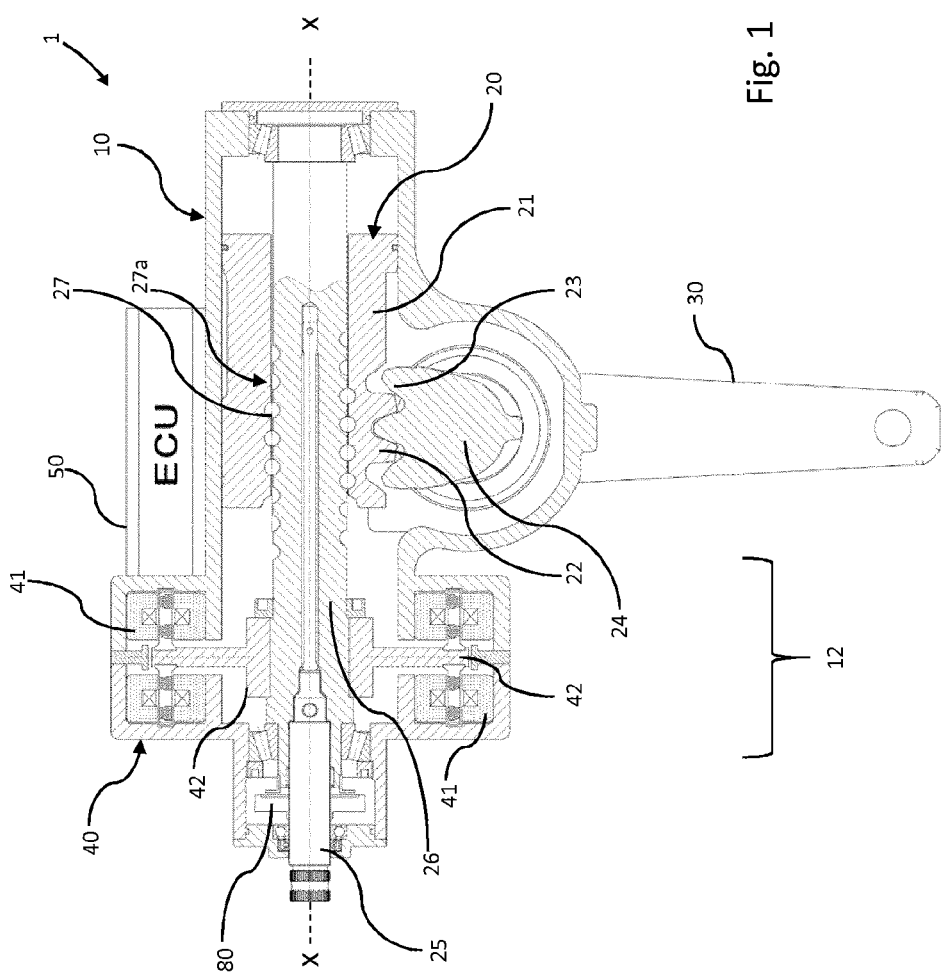
FIG. 1 shows a first design variant of a recirculating-ball steering system according to the invention in cross-section.

FIG. 1 shows a first design variant of the recirculating-ball steering system 1 according to the invention for transmitting a steering movement from the steering wheel (not shown) to a steering arm 30.

The recirculating-ball steering system 1 has a housing 10 with a steering piston 20, which is displaceable along a longitudinal axis X-X, arranged inside the housing 10. The steering piston 10 consists of several individual components, and comprises amongst others a steering nut 21, a steering worm screw 26 and a ball circulation unit 27, wherein the steering nut 21, the steering worm screw 26 and the ball circulation unit 27 form a first ball screw drive 27 and hence a first attack point by means of which a rotational movement is converted into a translational movement.

The steering nut 21 is arranged slidingly inside the housing 10 so that the axial longitudinal displacement of the steering piston 20 can be executed. The steering nut 21 on the outside has a toothing region 22 in which teeth 23 of the steering shaft 24 engage. The steering shaft 24 is connected to the steering arm 30 so that a longitudinal displacement of the steering piston 20 along the longitudinal axis X-X causes a twist of the steering shaft 24 and hence of the steering arm 30. The longitudinal displacement of the steering piston 20 is provoked by the driver via a drive shaft 25 which rotates in itself and connects a steering emitter (not shown), for example a steering wheel, to a steering worm screw 26.

Furthermore, the recirculating-ball steering system 1 comprises an electrical actuator 40 which is arranged transversely to the longitudinal axis X-X and can be actuated via a control device 50. In the present embodiment variant, the electrical actuator 40 is configured as an electric motor, in particular a transverse motor, and arranged inside the housing 10. By providing a torque, it supports the longitudinal displacement of the steering piston 20. For this, the electrical actuator 40 comprises a stator 41 which is arranged around the steering worm screw 26 and fixedly connected to the housing 10, and a rotor 42 fixedly connected to the steering worm screw 26. The steering worm screw 26 thus has a second attack point via which a torque can be transmitted to the steering worm screw 26.

Depending on the driver's steering command, which is detected via a sensor 80 positioned on the drive shaft 25, for example to detect a rotary angle or torque, and in some cases on further vehicle parameters, the electrical actuator 40 is actuated via the control device 50. The electrical actuator 40 here provides a torque which supports the rotational movement of the steering worm screw 26 and hence leads to a longitudinal displacement of the steering nut 21 along the longitudinal axis X-X, which in turn causes a twist of the steering shaft 24 and hence of the steering arm 30.

Figure 2:
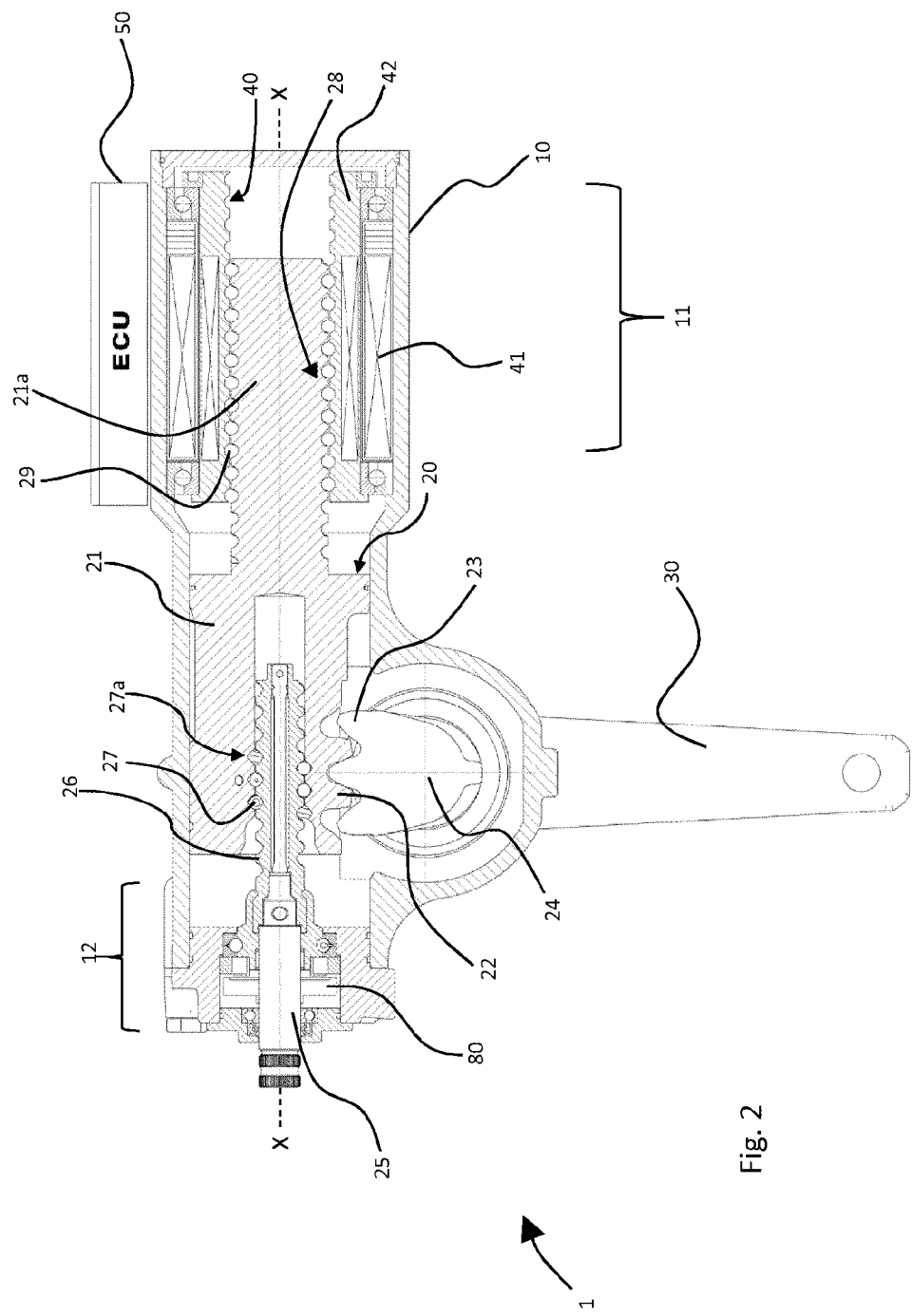
FIG. 2 shows a second design variant of a recirculating-ball steering system according to the invention in cross-section.

FIG. 2 shows a second design variant of the recirculating-ball steering system 1 according to the invention. In contrast to the first design variant, the recirculating-ball steering system 1 has a rear region 11 arranged opposite a front region 12. The front region 12 accommodates for example the drive shaft 25 which extends through the housing 10 and can be connected to the steering emitter.

In the present design variant, the steering piston 20 furthermore comprises a piston-like extension 21a which comprises a second ball screw drive 28 and extends into the rear region 11 of the recirculating-ball steering system 1. The steering piston 20 thus has a first ball screw drive 27 in the front region 12 and a second ball screw drive 28 in the rear region 11 of the recirculating-ball steering system 1.

Furthermore, the electrical actuator 40 is arranged inside the housing 10 in the rear region 11 of the recirculating-ball steering system 1, and in the present design variant is configured as an electric motor, in particular a hollow shaft servo-motor. By providing a torque, it supports the longitudinal displacement of the steering piston 20. The stator 41, arranged in the rear region 11, is arranged concentrically around the piston-like extension 21a and is fixedly connected to the housing 10. The rotor 42 is arranged between the piston-like extension 21a and the stator 41 and, together with a second ball circulation unit 29 and the piston-like extension 21a, forms the second ball screw drive 28. This specific arrangement provides sufficient support for the piston-like extension 21a inside the housing 10 so that no additional mounting of the piston-like extension 21a, for example by means of a ball bearing, is required.

Furthermore, the control device 50 is arranged in the rear region 11 outside the housing 10.

Depending on a steering command from the driver, which is detected via a sensor 80, and in some cases on further vehicle parameters, the electrical actuator 40 is actuated via the control device 50. The electrical actuator 40 here provides a torque which is transmitted to a second attack point on the steering piston 20 via the second ball screw drive 28, and supports the longitudinal displacement of the steering piston 20 along the longitudinal axis X-X.

Figure 3:
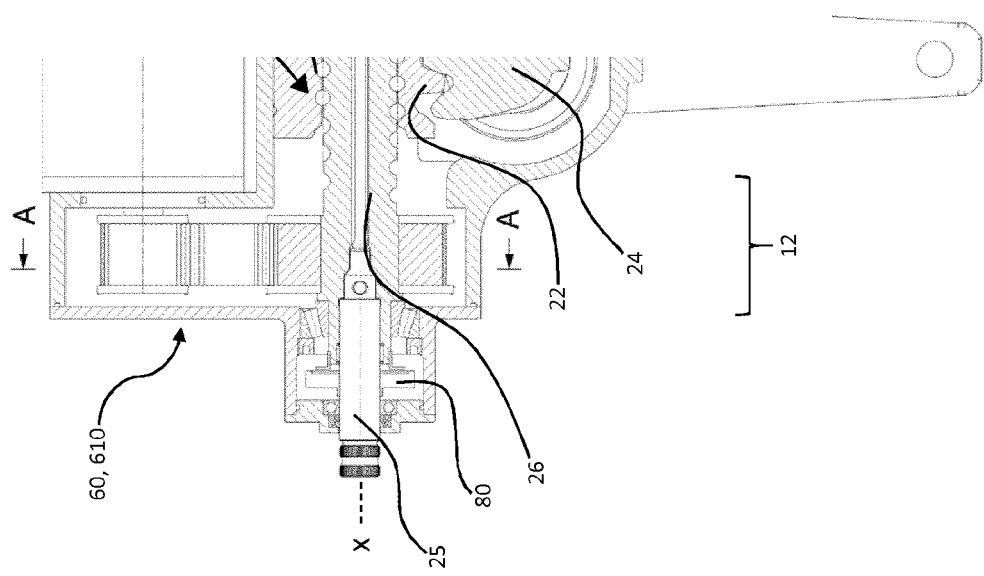
FIG. 3 shows a third design variant of a recirculating-ball steering system according to the invention in cross-section.
Figure 3A:
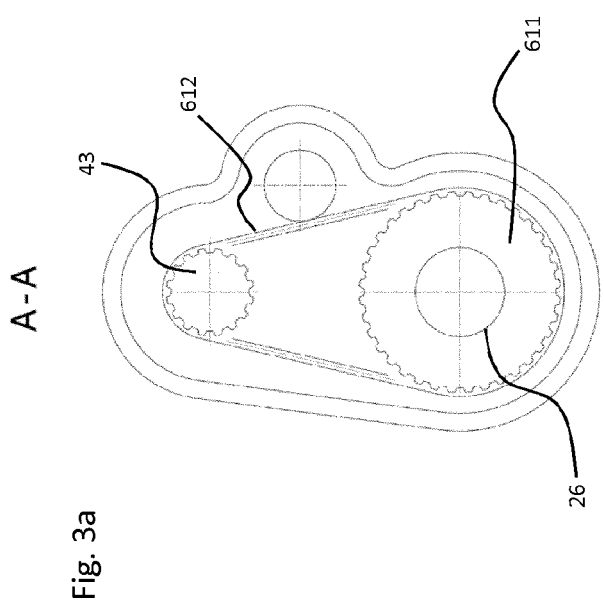
FIG. 3a shows an illustration of the embodiment variant from FIG. 3 along section line A-A.

FIGS. 3 and 3a show a third design variant of the recirculating-ball steering system 1 according to the invention for transmitting a steering movement from a steering wheel (not shown) to a steering arm 30.

The recirculating-ball steering system 1 substantially resembles the structure of the first design variant, with the difference that the torque of the electrical actuator 40 is transmitted to the steering worm screw 26 via a force transmission means 60, in particular a toothed belt gear 610. In the present design variant, the actuator 40 is arranged outside the housing 10 and configured as an electric motor, in particular a servo-motor.

The toothed belt gear 610 comprises a gear wheel 611 and a toothed belt 612 (FIG. 3a). The gear wheel 611 is fixedly connected to the steering worm screw 26 and thus has a second attack point via which a torque from the electrical actuator 40 can be transmitted to the steering worm screw 26. The toothed belt 612 is tensioned via the gear wheel 611 and a shaft 43 of the electrical actuator 40.

FIGS. 4 and 4*a* show a fourth design variant of the recirculating-ball steering system 1 according to the invention, which substantially resembles the structure of the second design variant with the difference that the torque of the electrical actuator 40 is transmitted to the steering piston 20 via a force transmission means 60, in particular a toothed belt gear 610. In the present design variant, the electrical actuator 40 is arranged outside the housing 10 and configured as an electric motor, in particular a servo-motor.

The toothed belt gear 610 comprises a gear wheel 611 and a toothed belt 612 (FIG. 4*a*). The gear wheel 611 is connected to the piston-like extension 21*a* via a gear nut 21*b*, and thus has a second attack point via which a torque from the electrical actuator 40 can be transmitted to the steering piston 20. The toothed belt 612 is tensioned via the gear wheel 611 and the shaft 43 of the electrical actuator 40.

The gear nut 21*b* is connected to the housing 10 via a mounting 70, for example a ball bearing, so that the steering piston 20 is mounted inside the housing 10 on at least two mutually spaced points and is limited in radial movement.

In the present exemplary embodiment, the electrical actuator 40 and the control device 50 are arranged relative to one another such that the entire recirculating-ball steering system 1 constitutes a compact structural unit.

Figure 5:
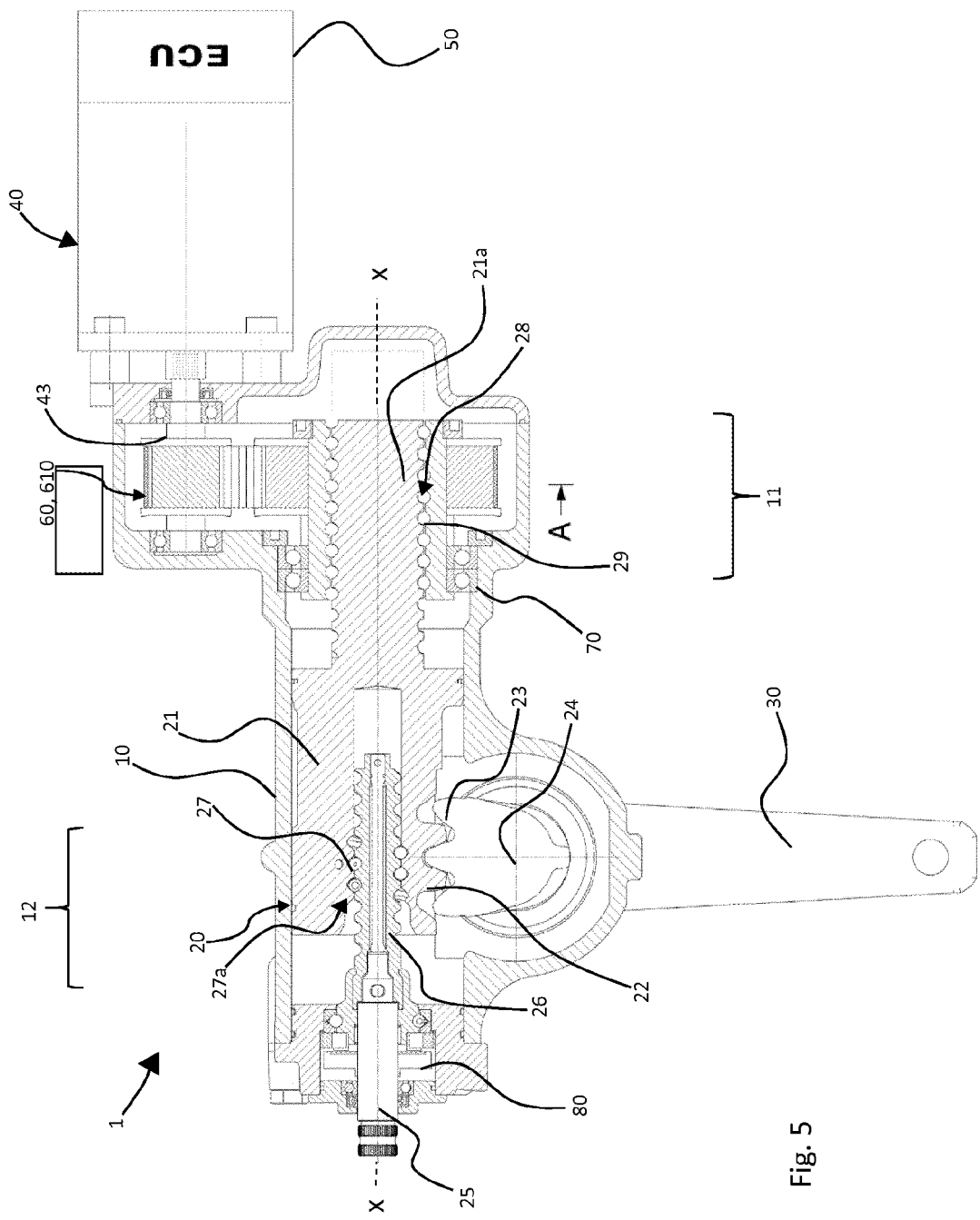
FIG. 5 shows a fifth design variant of a recirculating-ball steering system according to the invention in cross-section.

Alternatively, the electrical actuator 40 and the control unit 50 may also be arranged relative to one another such that the entire recirculating-ball steering system 1 constitutes a slender structural unit (FIG. 5).

FIGS. 6 and 6*a* show a sixth design variant of the recirculating-ball steering system 1 according to the invention, which substantially resembles the structure of the third design variant with the difference that a chain gear 620 is used as a force transmission means 60.

The chain gear 620 comprises several sprockets 621, 622 and 623 and a chain 624 (FIG. 4*a*). The sprocket 621 is fixedly connected to the steering worm screw 26 and thus has a second attack point via which a torque from the electrical actuator 40 can be transmitted to the steering worm screw 26. A further sprocket 622 sits on the shaft 43 and is fixedly connected thereto. The chain 624 runs over the sprockets 621, 622 and is tensioned by a chain tensioner wheel 623.

Figure 7:
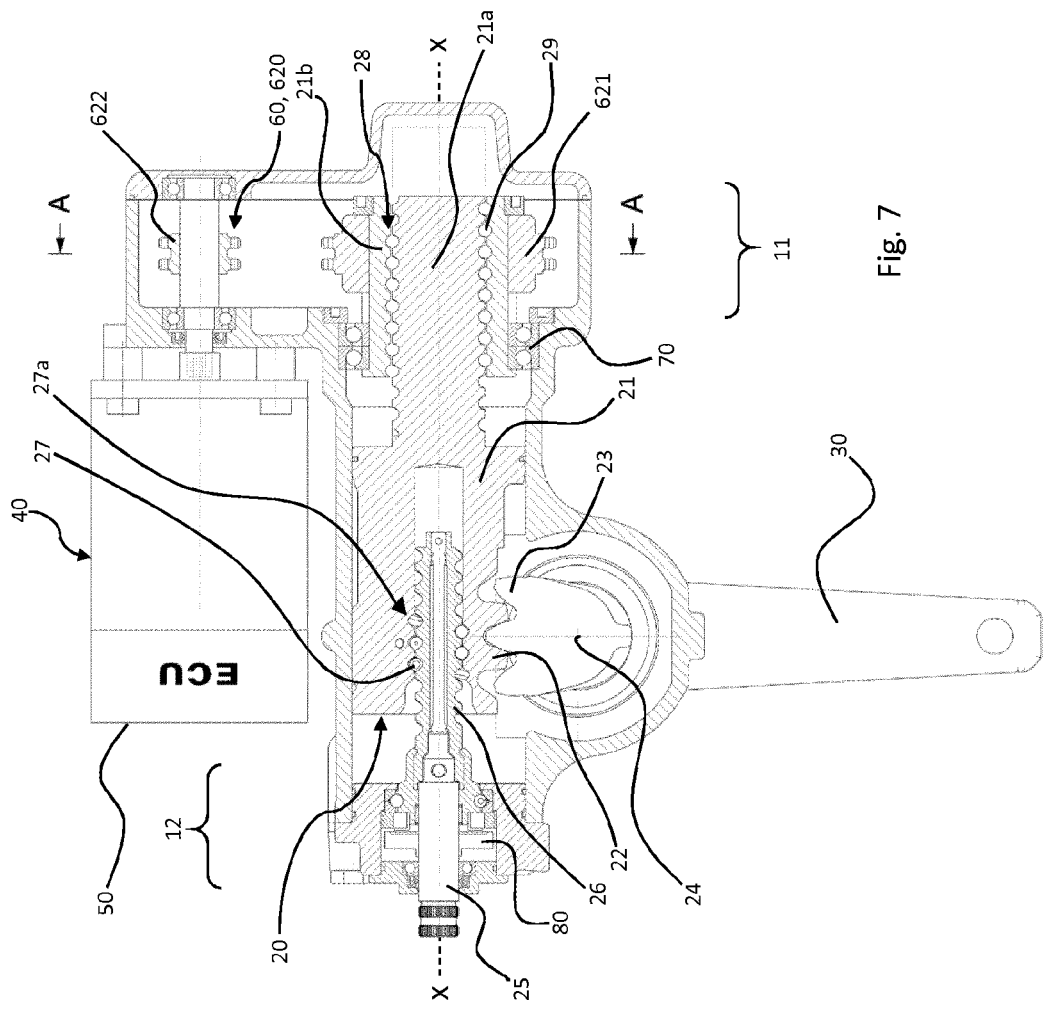
FIG. 7 shows a seventh design variant of a recirculating-ball steering system according to the invention in cross-section.
Figure 7A:
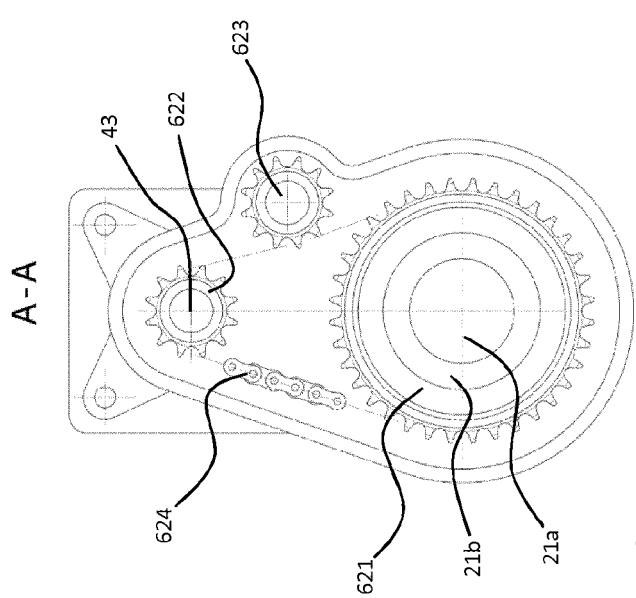
FIG. 7a shows an illustration of the embodiment variant from FIG. 7 along section line A-A.

FIGS. 7 and 7*a* show a seventh design variant of the recirculating-ball steering system 1 according to the invention, which substantially resembles the structure of the fourth design variant with the difference that a chain gear 620 is used as a force transmission means 60.

In the present design variant, as in the design variant in FIG. 4, the force transmission means 60 is arranged in the rear region 11. The sprocket 621 is fixedly connected to the piston-like extension 21*a* via a gear nut 21*b*, and thus has a second attack point via which a torque from the electrical actuator 40 can be transmitted to the steering piston 20. A further sprocket 622 sits on the shaft 43 of the electrical actuator 40 and is fixedly connected thereto. The chain 624 runs over the sprocket 621 and the sprocket 622 and is tensioned by a chain tensioner wheel 623.

Figure 8:
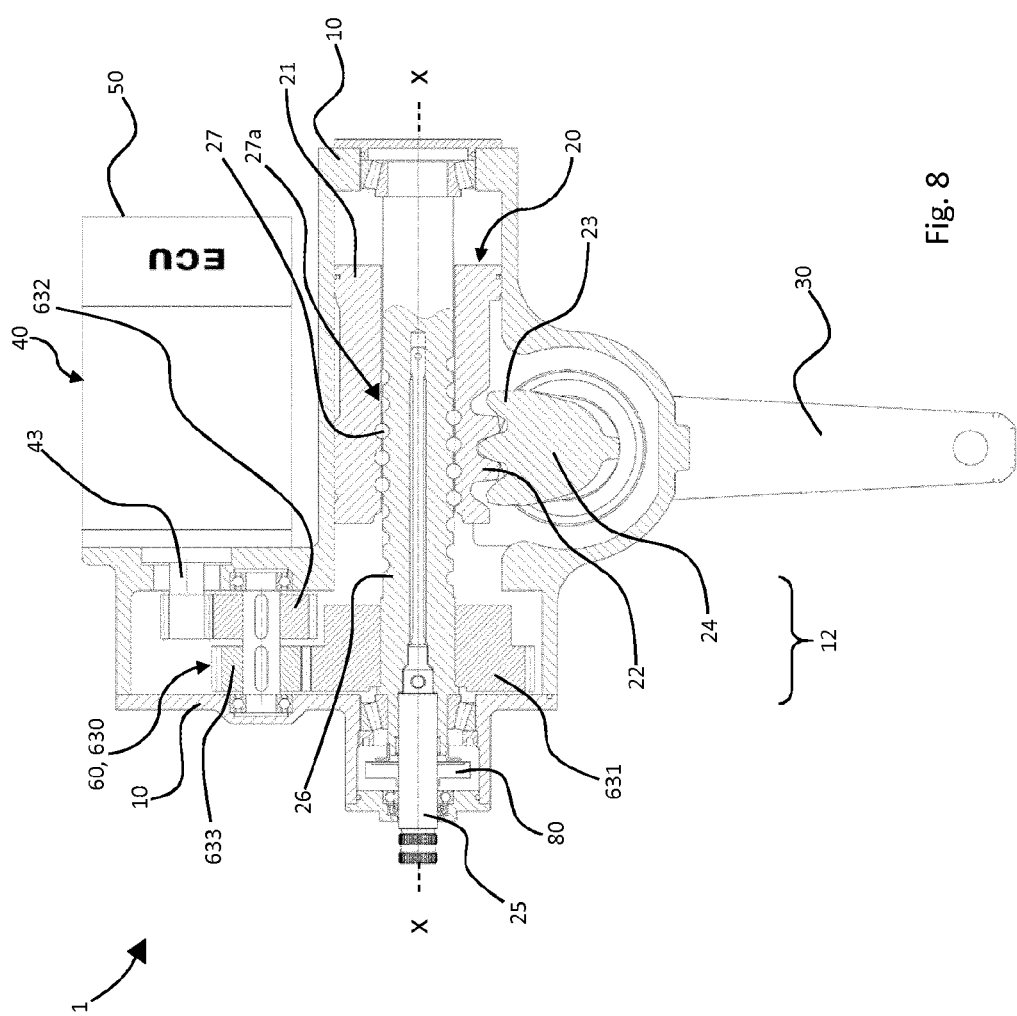
FIG. 8 shows an eighth design variant of a recirculating-ball steering system according to the invention in cross-section.

FIG. 8 shows an eighth design variant of the recirculating-ball steering system 1 according to the invention, which substantially resembles the structure of the third design variant with the difference that the force transmission means 60 comprises a cog gear 630.

In the present design variant, as in the design variant in FIG. 3, the force transmission means 60 is arranged in the front region 12 of the housing 10 and comprises several cogs 631, 632, 633 which intermesh and thus transmit a torque from the electrical actuator 40 to the steering worm screw 26.

Figure 9:
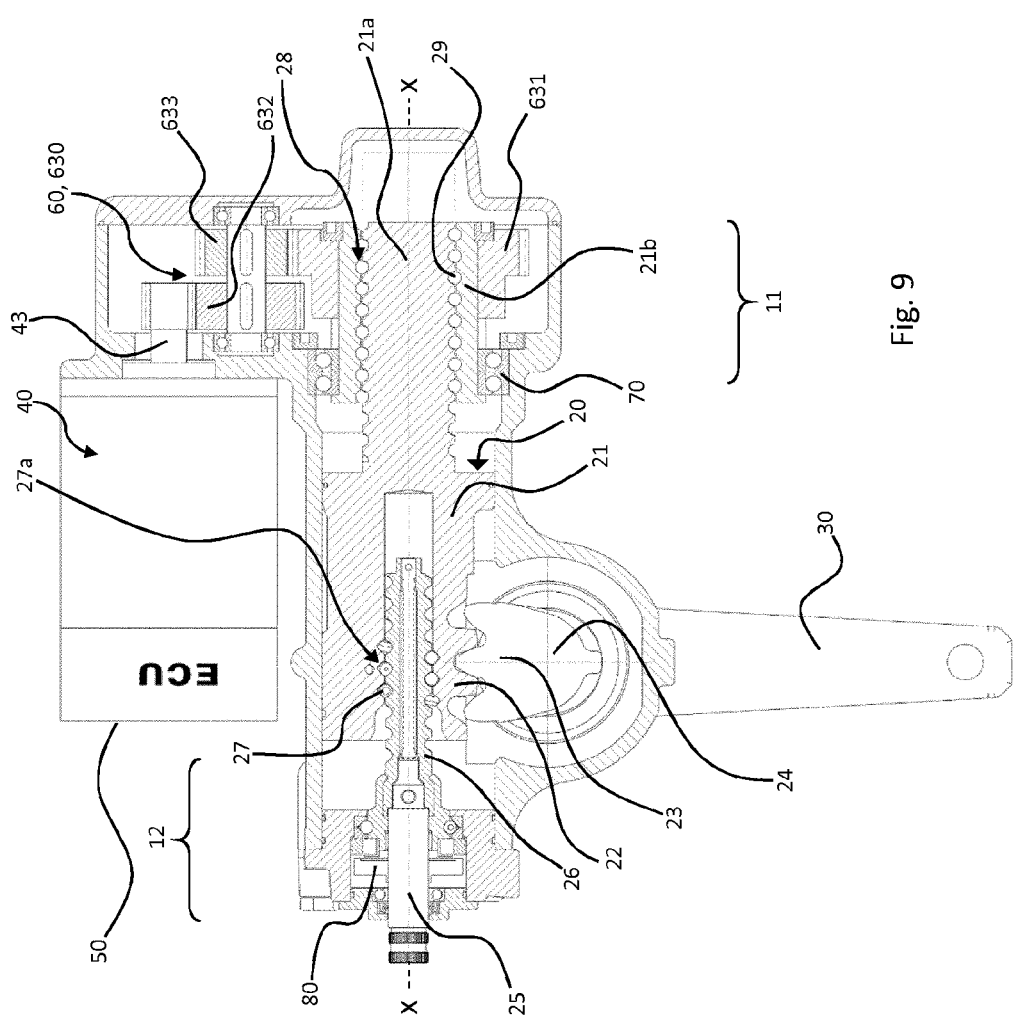
FIG. 9 shows a ninth design variant of a recirculating-ball steering system according to the invention in cross-section.

FIG. 9 shows a ninth design variant of the recirculating-ball steering system 1 according to the invention, which substantially resembles the structure of the fourth design variant with the difference that the force transmission means 60 comprises a cog gear 630.

In the present design variant, as in the design variant in FIG. 4, the force transmission means 60 is arranged in the rear region 11 of the housing 10 and comprises several cogs 631, 632, 633 which intermesh and thus transmit a torque from the electrical actuator 40 to the steering piston 20.

Figure 10:
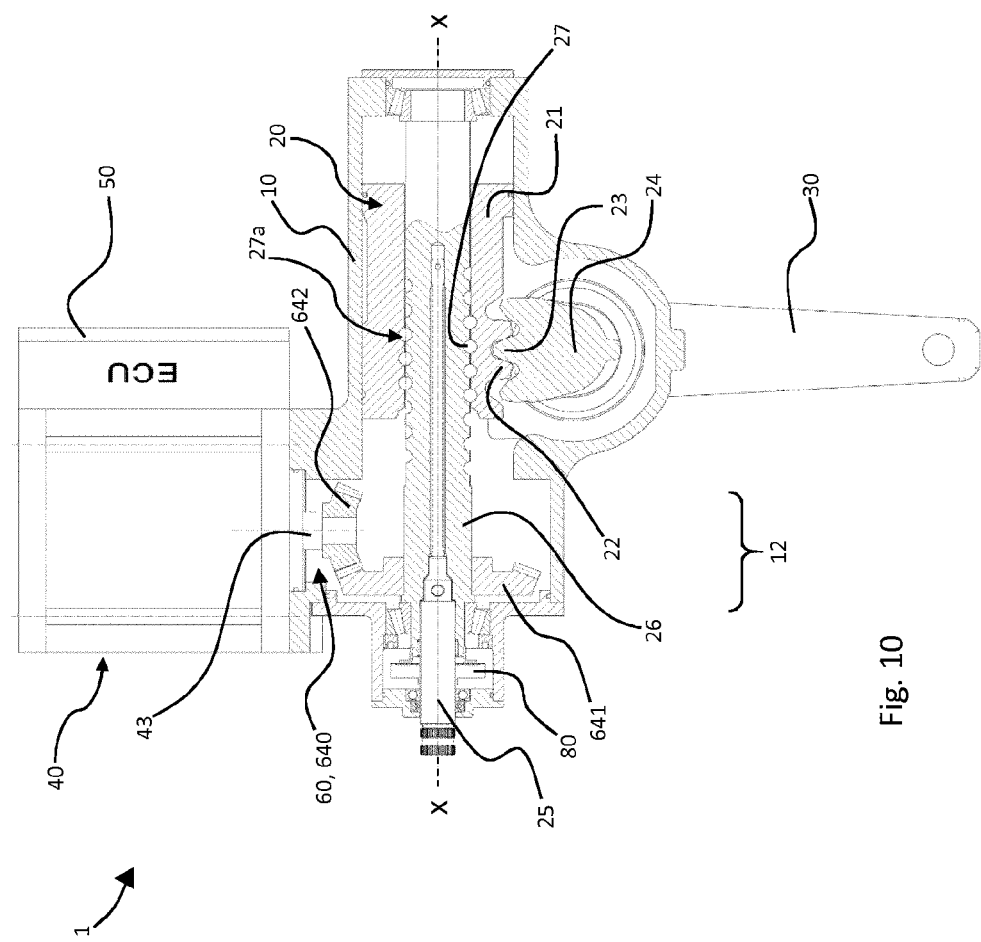
FIG. 10 shows a tenth design variant of a recirculating-ball steering system according to the invention in cross-section.

FIG. 10 shows a tenth design variant of the recirculating-ball steering system 1 according to the invention, which substantially resembles the structure of the third design variant with the difference that the force transmission means 60 comprises a bevel gear 640.

In the present design variant, as in the design variant in FIG. 3, the force transmission means 60 is arranged in the front region 12 of the housing 10 and comprises two gear wheels 641, 642 which intermesh and thus transmit a torque from the electrical actuator 40 to the steering worm screw 26.

Figure 11:
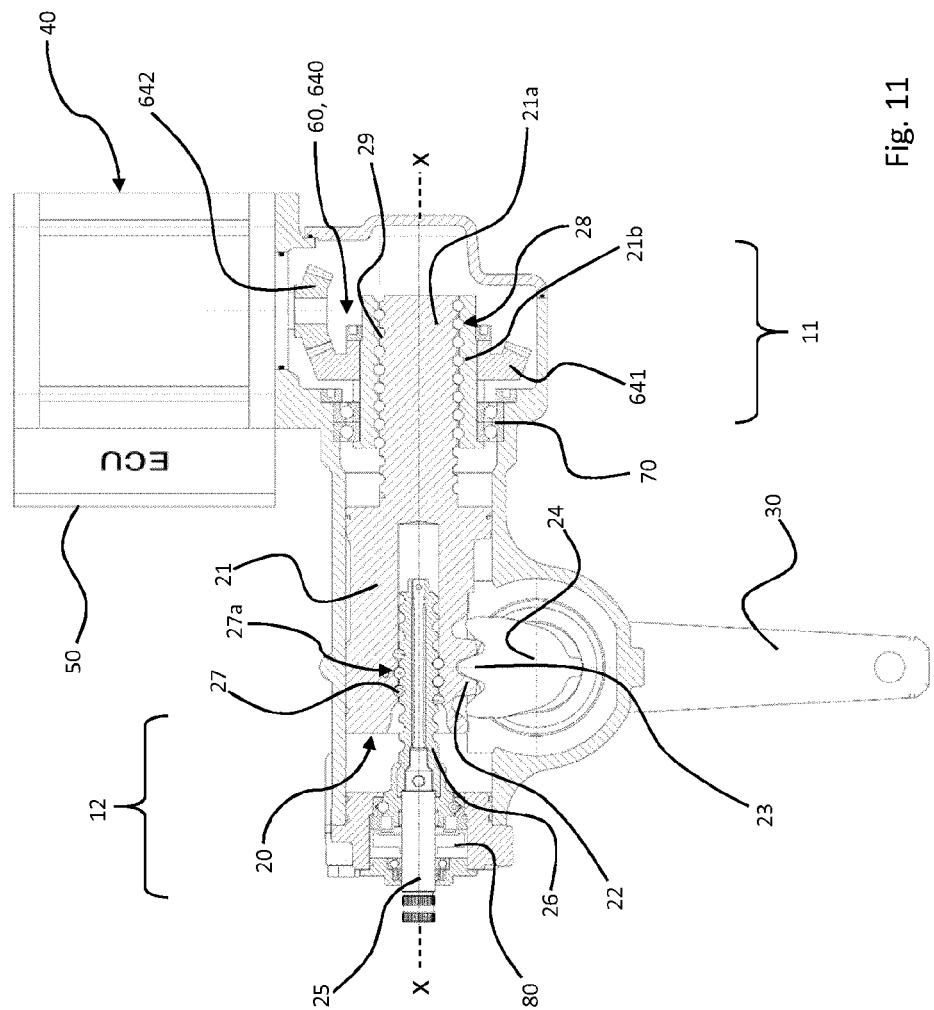
FIG. 11 shows a eleventh design variant of a recirculating-ball steering system according to the invention in cross-section.

FIG. 11 shows an eleventh design variant of the recirculating-ball steering system 1 according to the invention, which substantially resembles the structure of the fourth design variant with the difference that the force transmission means 60 comprises a bevel gear 640.

In the present design variant, as in the design variant in FIG. 4, the force transmission means 60 is arranged in the rear region 11 of the housing 10 and comprises two gear wheels 641, 642 which intermesh and thus transmit a torque from the electrical actuator 40 to the steering piston 20.

Figure 12:
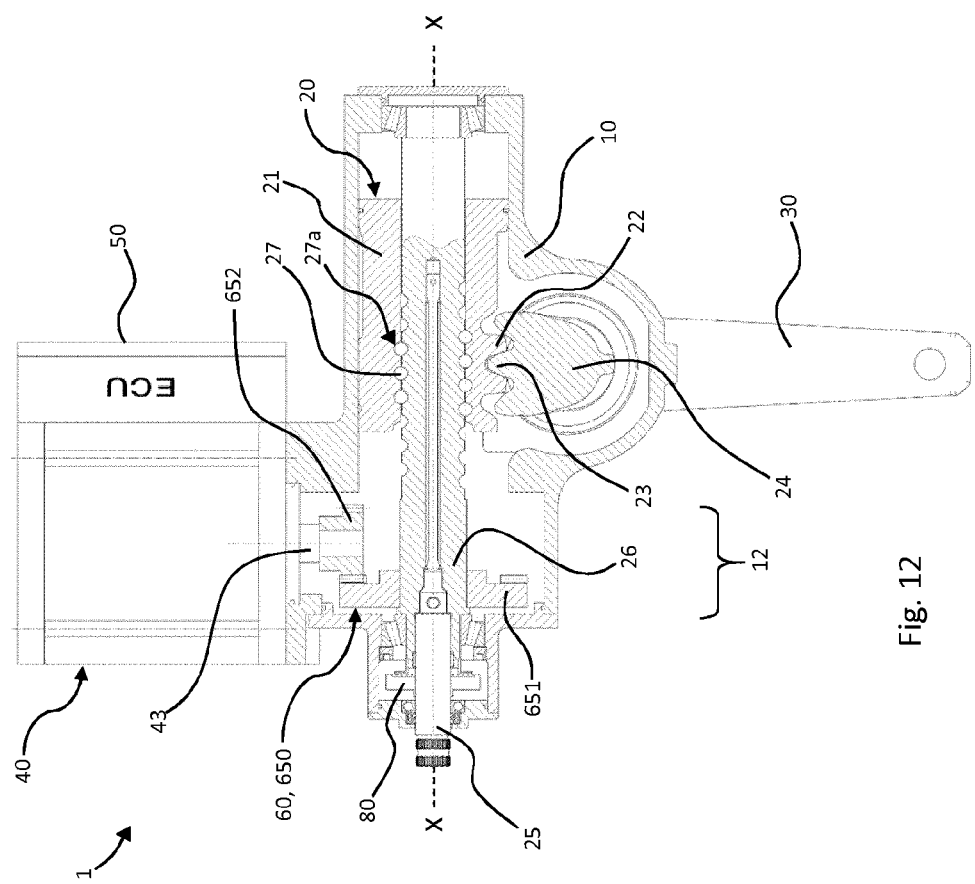
FIG. 12 shows a twelfth design variant of a recirculating-ball steering system according to the invention in cross-section.

FIG. 12 shows a twelfth design variant of the recirculating-ball steering system 1 according to the invention, which substantially resembles the structure of the third design variant with the difference that the force transmission means 60 comprises a worm gear 650.

In the present design variant, as in the design variant in FIG. 3, the force transmission means 60 is arranged in the front region 12 of the housing 10 and comprises two gear wheels 651, 652 which intermesh and thus transmit a torque from the electrical actuator 40 to the steering worm screw 26.

FIGS. 13 and 13*a* show a thirteenth design variant of the recirculating-ball steering system 1 according to the invention, which substantially resembles the structure of the fourth design variant with the difference that the force transmission means 60 comprises a worm gear 650.

In the present design variant, as in the design variant in FIG. 4, the force transmission means 60 is arranged in the rear region 11 of the housing 10 and comprises two gear wheels 661, 662 which intermesh and thus transmit a torque from the electrical actuator 40 to the steering piston 20.

Figure 13B:
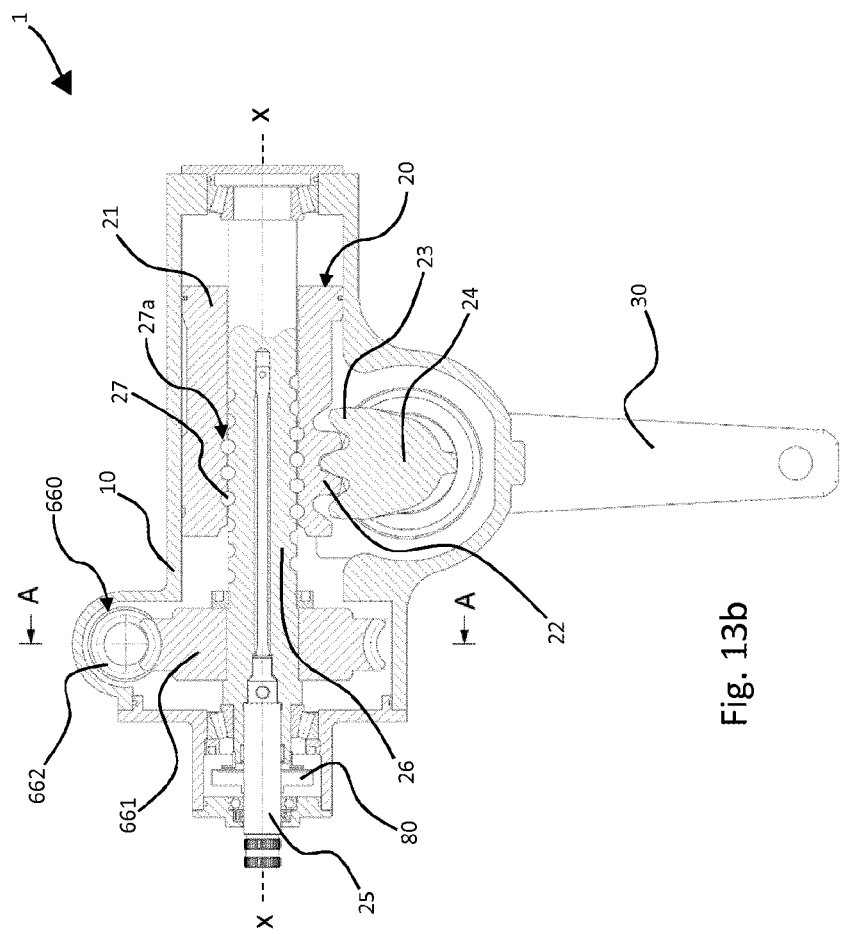
FIG. 13b shows a fourteenth design variant of a recirculating-ball steering system according to the invention in cross-section.

Finally, FIG. 13*b* shows a fourteenth design variant of the recirculating-ball steering system 1 according to the invention, which substantially resembles the structure of the third design variant with the difference that the force transmission means 60 comprises a worm gear 630.

In the present design variant, as in the design variant in FIG. 3, the force transmission means 60 is arranged in the front region 12 of the housing 10 and comprises two gear wheels 661, 662 which intermesh and thus transmit a torque from the electrical actuator 40 to the steering worm screw 26.

THE LIST OF REFERENCE SIGNS IS AS FOLLOWS

1 Recirculating-ball steering system
10 Housing
11 Rear region
12 Front region
20 Steering piston
21 Steering nut
21a Piston-like extension
21b Gear nut
22 Toothing region
23 Teeth
24 Steering shaft
25 Drive shaft
26 Steering worm screw
27 First ball circulation unit
27a First ball screw drive
28 Second ball screw drive
29 Second ball circulation unit
30 Steering arm
40 Electrical actuator
41 Stator
42 Rotor
43 Shaft
50 Control unit
60 Force transmission means
70 Mounting
80 Sensor
610 Toothed belt gear
611 Gear wheel
612 Toothed belt
620 Chain gear
621 Sprocket
622 Sprocket
623 Chain tensioner wheel
624 Chain
630 Cog gear
631 Cog
632 Cog
633 Cog
640 Bevel gear
641 Gear wheel
642 Gear wheel
650 Contrate gear
651 Gear wheel
652 Gear wheel
660 Worm gear
661 Gear wheel
662 Gear wheel

The invention claimed is:

1. A recirculating-ball steering system for transmitting a steering movement to a steering arm, comprising:
a housing having a steering piston arranged inside the housing, wherein the steering piston includes a ball screw drive and is displaceable along its longitudinal axis, and
an electrical actuator for assisting the movement of the steering piston;
wherein the steering piston includes the ball screw drive, which is a first ball screw drive, so as to provide a first attack point by which a rotational movement is converted into a translational movement, and
wherein the electrical actuator includes a stator arranged around a steering worm screw of the first ball screw drive and fixedly connected to the housing, and a rotor fixedly connected to the steering worm screw, so as to provide a second attack point via which a torque is transmitted to the steering worm screw.

2. The recirculating-ball steering system of claim 1, wherein the steering piston includes a second ball screw drive which is coupled to the electrical actuator.

3. The recirculating-ball steering system of claim 1, wherein the electrical actuator is connected to the steering piston via a force transmission means.

4. The recirculating-ball steering system of claim 3, wherein the force transmission means is selected from the group including a toothed belt gear, a chain gear, a cog gear, a bevel gear, a hypoid gear, a contrate gear or a worm gear.

5. The recirculating-ball steering system of claim 1, wherein the recirculating-ball steering system contains no hydraulic unit, and the movement of the steering piston is assisted purely electrically.

6. The recirculating-ball steering system of claim 1, wherein the steering piston includes a steering nut, the steering worm screw, and a ball circulation unit, wherein the steering nut, the steering worm screw, and the ball circulation unit form the first ball screw drive.

7. The recirculating-ball steering system of claim 6, wherein the electrical actuator is arranged transversely to a longitudinal axis of the steering worm screw, and is actuatable via a control device.

8. The recirculating-ball steering system of claim 1, wherein the recirculating-ball steering system includes a rear region arranged opposite a front region, which accommodates the drive shaft which extends through the housing.

9. The recirculating-ball steering system of claim 8, wherein the steering piston includes a piston-like extension having a second ball screw drive and extends into the rear region, so that the steering piston has the first ball screw drive in the front region and the second ball screw drive in the rear region.

10. The recirculating-ball steering system of claim 9, wherein the electrical actuator is arranged inside the housing in the rear region of the recirculating-ball steering system.

11. A vehicle, comprising:
a recirculating-ball steering system for transmitting a steering movement to a steering arm of the vehicle;
wherein the recirculating-ball steering system includes:
a housing having a steering piston arranged inside the housing, wherein the steering piston includes a ball screw drive and is displaceable along its longitudinal axis, and
an electrical actuator for assisting the movement of the steering piston;
wherein the steering piston includes the ball screw drive, which is a first ball screw drive, so as to provide a first attack point by which a rotational movement is converted into a translational movement, and
wherein the electrical actuator includes a stator arranged around a steering worm screw of the first ball screw drive and fixedly connected to the housing, and a rotor fixedly connected to the steering worm screw, so as to provide a second attack point via which a torque is transmitted to the steering worm screw.

12. The vehicle of claim 11, wherein the steering piston includes a steering nut, the steering worm screw, and a ball circulation unit, and wherein the steering nut, the steering worm screw, and the ball circulation unit form the first ball screw drive.

13. The vehicle of claim 12, wherein the electrical actuator is arranged transversely to a longitudinal axis of the steering worm screw, and is actuatable via a control device.

14. The vehicle of claim 11, wherein the recirculating-ball steering system includes a rear region arranged opposite a front region, which accommodates the drive shaft which extends through the housing.

15. The vehicle of claim 14, wherein the steering piston includes a piston-like extension having a second ball screw drive and extends into the rear region, so that the steering piston has the first ball screw drive in the front region and the second ball screw drive in the rear region.

16. The vehicle of claim 15, wherein the electrical actuator is arranged inside the housing in the rear region of the recirculating-ball steering system.

\* \* \* \* \*